United States Patent Office 3,173,302
Patented Mar. 16, 1965

3,173,302
GEARING
Charles Robinson, 34 Maes-Y-Coed Road,
Cardiff, Glamorgan, Wales
Filed Oct. 31, 1962, Ser. No. 234,910
Claims priority, application Great Britain, Nov. 8, 1961,
39,968/61
11 Claims. (Cl. 74—342)

This invention relates to lathe headstock gearing and resides in new or improved features of the arrangement and operation of such gearing.

The invention includes a lathe headstock gearbox for driving a lathe spindle and a feed drive shaft, in which the speed of the feed drive shaft relative to the spindle can be varied so as to be lower when the spindle is driven at its highest speed or speeds, and higher when the spindle is driven at its lower speed or speeds. Preferably the change of ratio of the shaft speed to the spindle speed takes place automatically when the spindle speed is raised or lowered, so that it is impossible for an operator to use an excessively high feed rate with a high spindle speed.

Figure 1:
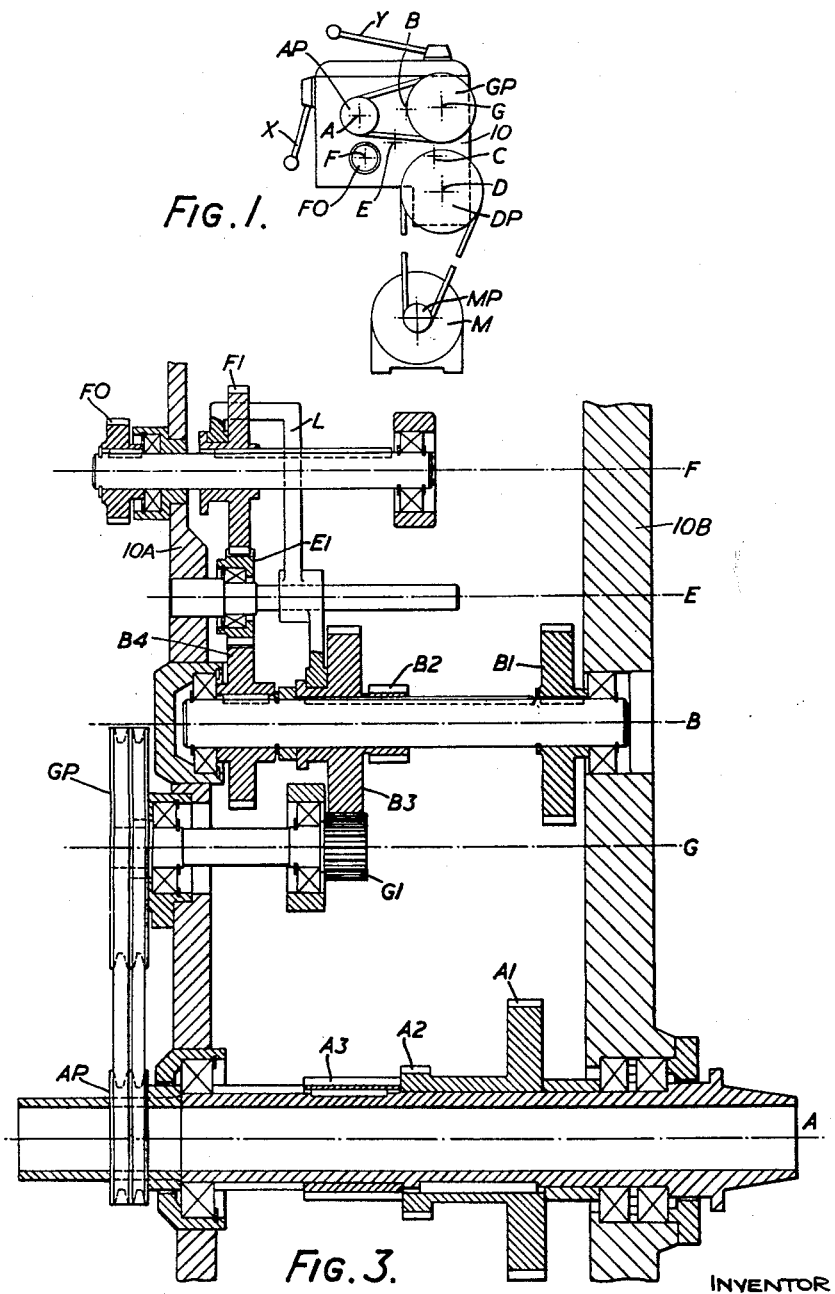
Figure 2:
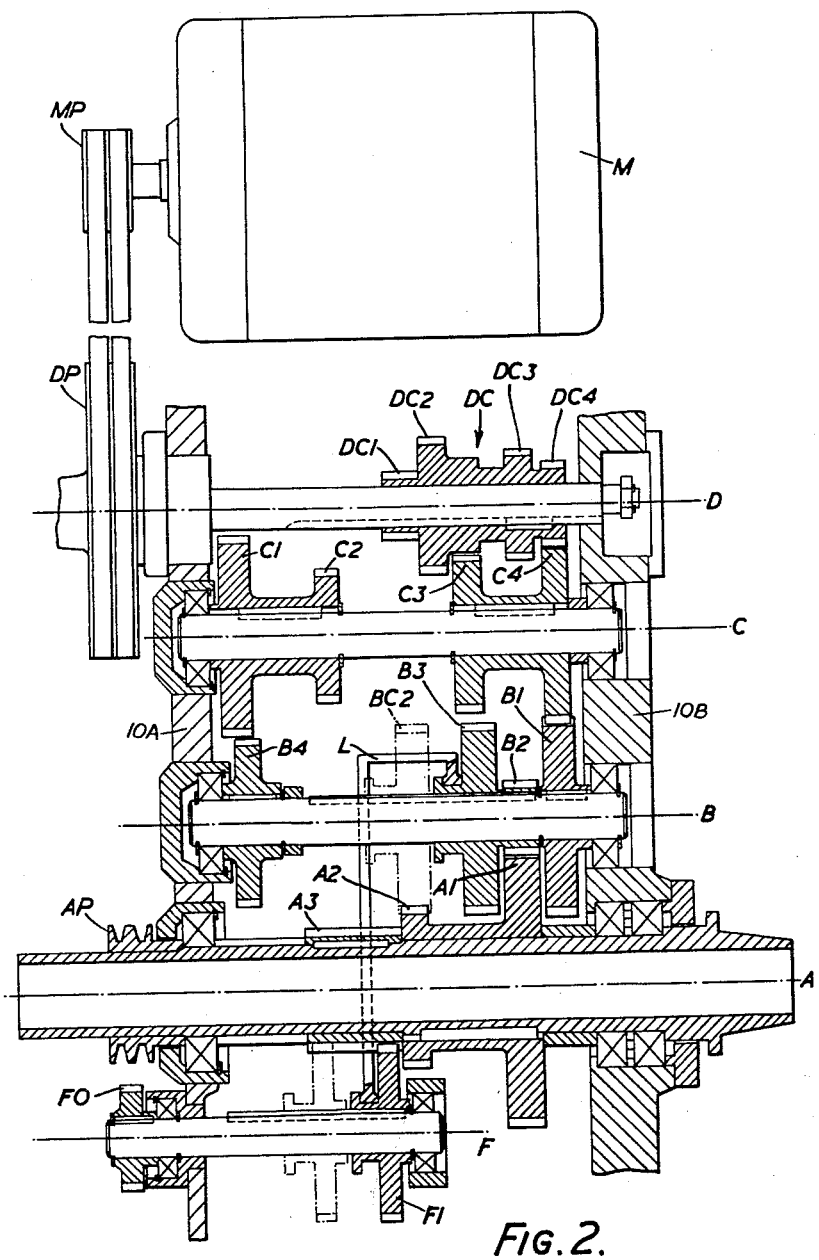
Figure 4:
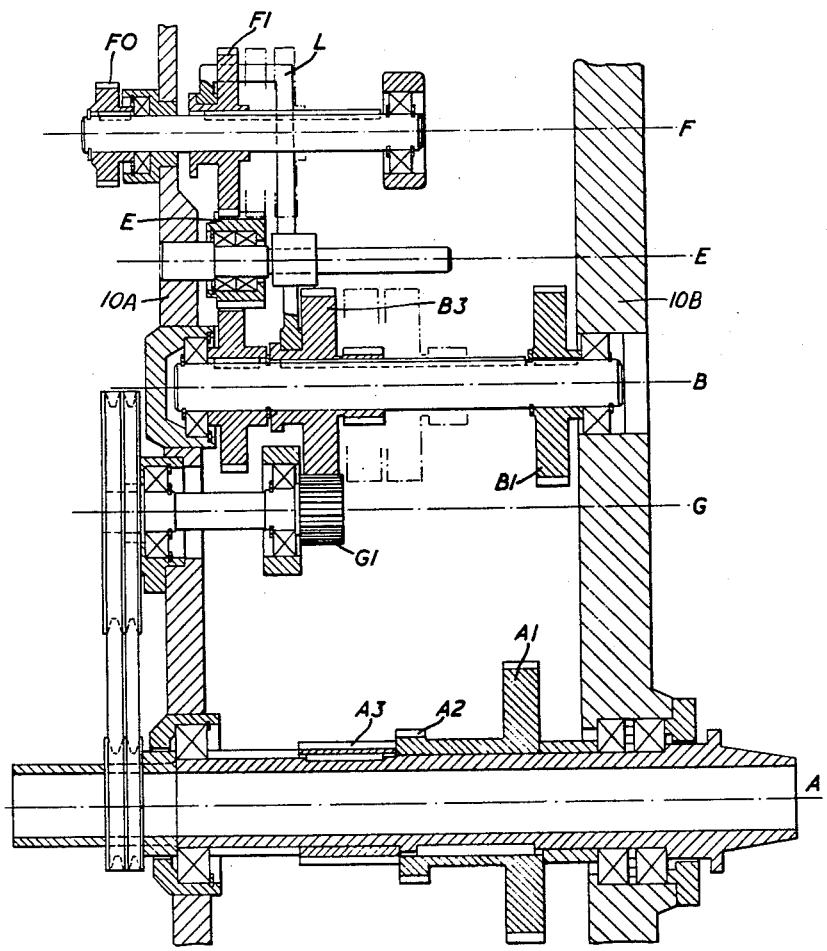

The scope of the invention is defined in the appended claims, and features and advantages thereof will appear from the following description of lathe headstock gearbox arranged and operating in accordance with the invention. This headstock gearbox is illustrated in the accompanying drawings in which:

FIGURE 1 is an end view of the headstock;
FIGURE 2 is a diagrammatic side view showing the drive connections for one speed range;
FIGURE 3 is a view similar to FIGURE 2 showing the drive connections for another speed range; and
FIGURE 4 is a view similar to FIGURE 3 showing a modification.

In the following description, the various shafts of the gearbox are identified by the letters A to G, and gear wheels carried by those shafts are denoted by the same letters suffixed with a numeral. Thus, for example B1 is a gear on a shaft B.

The headstock comprises a gearbox 10 whose end walls 10A and 10B support the shafts of the gearing in suitable bearings, with the exception of a shaft E which is fast with the wall 10A.

The gearing comprises a headstock spindle A and a feed drive shaft F carrying a final drive pinion F0 which can be coupled through gearing to the feed screw of a lathe. For operation in a lower speed range, spindle A is coupled to an input shaft D through a variable ratio gearing comprising a train of gears carried by shafts C and B, and in this lower range the feed drive shaft F is coupled directly to spindle A. For operation in an upper speed range, spindle A is coupled to input shaft D through a variable ratio transmission comprising a train of gears carried by shafts D, C, B and G, and a belt drive from a pulley GP on shaft G to a pulley AP on spindle A. In this upper speed range shaft F is coupled to the intermediate shaft B by an idler gear carried on a shaft E. With this arrangement the feed pick-off shaft F is driven at a constant speed, relative to the spindle A in the lower speed range of the spindle, and at a lower constant speed relative to spindle A in the upper speed range.

FIGURE 2 illustrates the drive connections for the lower speed range of the spindle A.

The output shaft of a motor M carries a pulley MP which is coupled by a belt to a pulley DP carried by shaft D. This shaft carries a compound gear DC comprising wheels DC1, DC2, DC3, and DC4 having 18, 40, 32 and 24 teeth respectively.

Gear DC is movable axially along shaft D to bring one or other of the wheels into mesh with a corresponding wheel on shaft C, that is, one of the wheels C1, C2, C3 and C4, having 61, 39, 47 and 55 teeth respectively. Shaft C is therefore driven at one of four speeds relative to shaft D, dependent in the position of gear DC which is moved by means of a handle Y shown in FIGURE 1. Gear wheel C4 is in constant mesh with a wheel B1 having 61 teeth and carried by the intermediate shaft B. A compound gear BC is keyed to shaft B but is slidable axially therealong. This compound gear comprises wheels B2 and B3 having 21 and 57 teeth, respectively. In the illustrated position of gear BC, wheel B2 meshes with a spindle gear wheel A1, having 84 teeth, fast with spindle A, but moving the gear BC to its position BC2, shown in chain dot, brings the wheel B3 into mesh with a spindle gear wheel A2 having 47 teeth. Spindle A is thus adapted to be driven at either one of 2 speeds relative to shaft B and therefore at any one of 8 speeds relative to shaft D.

A third wheel or, feed drive spindle gear A3, having 42 teeth is also fast with spindle A and meshes with a feed gear wheel F1, having 63 teeth, keyed to the feed drive shaft F. Feed gear wheel F1 is slidable along its shaft and is coupled for axial movement with the shiftable gear BC by a shifter fork L operable by a handle X, shown in FIGURE 1. The feed drive spindle gear wheel A3 is extended axially so as to remain in mesh with wheel F1 for both of the illustrated positions of gear BC. It follows that for each of the eight possible speeds of spindle A in the lower speed range, the speed of feed drive shaft F=speed of spindle A×42/63=speed of spindle A×2/3.

The drive connections for the upper speed range of spindle A are illustrated in FIGURE 3.

The drive connections between the motor and the intermediate shaft B are exactly as illustrated in FIGURE 2, but the shifter fork L is now in an extreme left hand position in which gear wheels B3 and A2, and A3 and F1, respectively are uncoupled.

The shiftable gear wheel B3 now meshes with a pulley gear wheel G1, having 19 teeth, fast with a pulley shaft G which also carries a driving pulley GP coupled by a belt to a driven pulley AP fast with spindle A, the pulleys being dimensioned to give a step up ratio between shaft G and spindle A of 2:1.

The gear wheel F1 meshes with an idler gear E1 carried by shaft E, which idler gear is in constant mesh with a fixed wheel B4, having 63 teeth, fast with the intermediate shaft B.

Since wheel F1 also has 63 teeth, shaft F is driven at the same speed as shaft B. Thus for each of the four possible speeds of spindle A in the upper speed range, the speed of shaft F=speed of spindle A×1/2×19/57= speed of spindle A×1/6. Thus the ratio of the speed of shaft F relative to the speed of spindle A in the lower and in the upper speed ranges, respectively is equal to 2/3×6/1=4:1. The main advantage of the arrangement is that it prevents the employment of a very high feed ratio when the spindle speed is high.

In the above described gearing, the shifter fork L is effective to engage gear BC either with one of the spindle gear wheels A1 and A2, or with the pulley gear G1, and there is no intermediate or neutral shifter fork position. Similarly, the shifter fork is effective to move the feed drive gear F1 into engagement either with the feed drive spindle gear A3, to complete one transmission drive for the shaft F, or with the idler gear E to complete the second transmissive drive to that shaft. Again there is no intermediate neutral position of the shifter fork L.

However, in a modified version of the above described headstock gearbox, illustrated in FIGURE 4 the gears A2 and G1 are spaced further apart axially, and the idler gear wheel E1 is made longer. When the gears BC and F are moved one step to the left of the chain dot position BC2 in FIGURE 2, they do not engage any other wheels, and so the drives to the spindle and the feed pick-off shaft are disconnected; a movement of one more step to the left brings wheel F1 into mesh with idler gear E1 so that the shaft F is driven, but wheel BC remains completely disengaged, thus allowing operations such as spline or groove cutting to be carried out; a third movement of one step to the left brings gear wheel B3 into mesh with pulley gear G1 so that drive connections as shown in FIGURE 3 are established.

Other variations are possible within the scope of the invention, which is not limited to the particular arrangements and modes of operation described above. In particular, the invention is not limited to a 12 speed gearbox, nor by the particular gear ratios mentioned.

I claim:

1. A lathe headstock gearing for driving a lathe spindle and a feed drive shaft, comprising: an input shaft; an intermediate shaft; a variable ratio gearing coupling the input shaft to the intermediate shaft; a spindle gear fast with the spindle; a driven pulley fast with the spindle; a pulley shaft; a driving pulley and a pulley gear fast with the pulley shaft; a belt drive between the driving and driven pulleys; a shiftable gear slidably keyed to the intermediate shaft; means for moving the shiftable gear into engagement with the said spindle gear, to provide one range of spindle speeds, or alternatively into engagement with the said pulley gear, to provide a second range of spindle speeds higher than said one range; a fixed gear fast with the intermediate shaft; an idler gear meshing with the said fixed gear; a feed drive spindle gear fast with the spindle; a feed gear slidably keyed on the feed drive shaft; and means for moving the feed gear into engagement with the said feed drive spindle gear, or alternatively into engagement with the said idler gear to provide higher and lower speed ratios, respectively of the feed drive shaft relative to the spindle.

2. Gearing in accordance with claim 1, comprising a common shifter fork for moving the said shiftable gear on the intermediate shaft and the feed gear.

3. Gearing in accordance with claim 2 in which the glut has two possible intermediate positions, one in which neither of the shiftable gears engages any other gears, and another in which the shiftable gear on the intermediate shaft is disengaged, to disconnect the spindle drive, while the feed gear is engaged to complete a drive to the feed drive shaft.

4. Gearing in accordance with claim 1 wherein the shiftable gear on the intermediate shaft and the spindle gear are compound gears each having a plurality of wheels each adapted to cooperate with a corresponding wheel on the other gear, whereby the shiftable gear has a plurality of positions of engagement with the spindle gear.

5. Gearing in accordance with claim 1, wherein the shiftable gear on the intermediate shaft and the spindle gear are compound gears having a plurality of wheels each adapted to co-operate with a corresponding wheel on the other gear whereby the shiftable gear has two axially spaced positions of engagement with the spindle gear, and said feed gear is coupled to said shiftable gear for movement in unison therewith, said feed gear remaining in engagement with the said spindle gear in both of said positions of said shiftable gear, but being moved into engagement with the said idler gear when the shiftable gear is moved into engagement with said pulley gear.

6. A lathe headstock gearing for driving a lathe spindle and a feed drive shaft, comprising variable ratio transmission means for selectively driving the spindle at a first range of different spindle speeds and at a second range of spindle speeds lower than said spindle speeds of said first range, a first transmissive means operable to drive said feed drive shaft at a first speed ratio, relative to the spindle speeds, when said spindle is driven at speeds in said first range, a second transmissive means operable to drive the feed drive shaft at a second speed ratio, relative to the spindle speeds, when said spindle is driven at speeds in said second range, said second speed ratio being higher than said second speed ratio, said first and second ratios remaining constant throughout said respective speed ranges, and means responsive to a change in the drive ratio of said variable ratio transmission means to render either said first or second transmissive means operable and the other inoperable as appropriate.

7. A lathe headstock gearing for driving a lathe spindle and a feed drive shaft, comprising variable ratio transmission means for selectively driving the spindle at one spindle speed or at a second spindle speed lower than said first spindle speed, a first transmissive means operable to drive the feed drive shaft at one speed ratio relative to the spindle when the spindle is driven at its lower speed, a second transmissive means operable to drive the feed drive shaft at a speed ratio, relative to the spindle, lower than the said one speed ratio when the spindle is driven at its higher speed, and means responsive to a change in the ratio of the said variable ratio transmission means to render either the said first or second transmissive means operable and the other inoperable, as appropriate, said first and second transmissive means including a common intermediate shaft having a shiftable gear slidably keyed thereon, the said gear being movable between a position in which it engages a spindle gear fast with the spindle, so that the intermediate shaft is directly coupled to the spindle, and another position in which it engages another shaft which is coupled to the spindle, so that the intermediate shaft is indirectly coupled to the spindle.

8. Gearing in accordance with claim 7 wherein the shiftable gear on the intermediate shaft has a possible neutral position in which no drive is transmitted to the spindle, the feed drive shaft being operable while the shiftable gear is in its neutral position.

9. A lathe headstock gearing for driving a lathe spindle and a feed drive shaft, comprising variable ratio transmission means for selectively driving the spindle at one spindle speed or at a second spindle speed lower than said first spindle speed, a first transmissive means operable to drive the feed drive shaft at one speed ratio relative to the spindle when the spindle is driven at its lower speed, a second transmissive means operable to drive the feed drive shaft at a speed ratio, relative to the spindle, lower than the said one speed ratio when the spindle is driven at its higher speed, and means responsive to a change in the ratio of the said variable ratio transmission means to render either the said first or second transmissive means operable and the other inoperable, as appropriate, said first transmissive means including a direct coupling between the spindle and the feed drive shaft, and the coupling including a shiftable feed gear which is movable out of engagement with the spindle and into engagement with a gear driven by an intermediate shaft common to the first and second transmissive means.

10. A lathe headstock gearing for driving a lathe spindle and a feed drive shaft, comprising variable ratio transmission means for selectively driving the spindle at one spindle speed or at a second spindle speed lower than said first spindle speed, a first transmissive means operable to drive the feed drive shaft at one speed ratio relative to the spindle when the spindle is driven at its lower speed, a second transmissive means operable to drive the feed drive shaft at a speed ratio, relative to the spindle, lower than the said one speed ratio when the spindle is driven at its higher speed, said variable ratio transmission means including a shiftable gear having three axially spaced operative positions corresponding to different spindle speeds, and said first transmissive means including a direct coupling between a spindle gear fast with the spindle and a feed gear, said gearing further comprising means coupling said shiftable gear and said feed gear for movement in unison, said spindle gear and feed gear being of sufficient axial length to remain in mesh for two of said portions of said shiftable gear, and movement of the said shiftable gear into its third said position being accompanied by movement of said feed gear out of engagement with said spindle gear and into engagement with a gear included in said second transmissive means.

11. Gearing in accordance with claim 10, wherein the first transmissive means includes a direct coupling between the spindle and the feed drive shaft, the coupling including a feed gear which is movable out of engagement with the spindle and into engagement with a gear included in the second transmissive means, the said feed gear and the said shiftable gear being coupled together for movement in unison.

References Cited by the Examiner
UNITED STATES PATENTS
2,464,619   3/49   Siekmann et al. _____ 74—333

DON A. WAITE, *Primary Examiner.*